United States Patent
Kim et al.

(10) Patent No.: US 7,921,065 B2
(45) Date of Patent: Apr. 5, 2011

(54) ONTOLOGY SYSTEM FOR CONTEXT-AWARE, METHOD THEREOF, AND RECORDING MEDIUM STORING THE SAME

(75) Inventors: Jung Hoon Kim, Gyeong Sang Nam-do (KR); Ki Chul Lee, Gyeonggi-do (KR); Jee Hyong Lee, Seoul (KR); Tae Bok Yoon, Gyeonggi-do (KR)

(73) Assignee: Sungkyunkwan University Foundation For Corporation Collaboration, Gyeonggi-Do (KR)

( * ) Notice: Subject to any disclaimer, the term of this patent is extended or adjusted under 35 U.S.C. 154(b) by 697 days.

(21) Appl. No.: 11/927,732

(22) Filed: Oct. 30, 2007

(65) Prior Publication Data

US 2008/0208774 A1 Aug. 28, 2008

(30) Foreign Application Priority Data

Feb. 23, 2007 (KR) .................. 10-2007-0018495

(51) Int. Cl.
*G06F 15/18* (2006.01)
*G06F 17/20* (2006.01)
(52) U.S. Cl. ............. 706/12; 704/10; 704/9; 717/106
(58) Field of Classification Search .............. 704/10; 706/60

See application file for complete search history.

(56) References Cited

U.S. PATENT DOCUMENTS

| | | | |
|---|---|---|---|
| 2006/0074832 A1* | 4/2006 | Gardner et al. | 706/45 |
| 2007/0118357 A1* | 5/2007 | Kasravi et al. | 704/10 |
| 2007/0130112 A1* | 6/2007 | Lin | 707/2 |

FOREIGN PATENT DOCUMENTS

| | | |
|---|---|---|
| KR | 20070039785 A | 4/2007 |
| KR | 20070049416 A | 5/2007 |

* cited by examiner

*Primary Examiner* — Donald Sparks
*Assistant Examiner* — Kalpana Bharadwaj
(74) *Attorney, Agent, or Firm* — Rabin & Berdo, P.C.

(57) ABSTRACT

Provided are an ontology system, a method for managing the ontology system, and a recording medium storing the same. The ontology system includes: a context broker unit for receiving context information from a sensing device and verifying a validity of the received context information; a context managing unit for controlling to generate an ontology structure by transforming the verified context information from the context broker unit to ontology web language (OWL) data and processing the OWL data; a rule-based inference engine unit for transforming the processed context information from the context managing unit to semantic web rule language (SWRL) data and processing the SWRL data through an inference process; a learning managing unit for processing the processed context information from the context managing unit through learning; and a database for storing the context information processed at the context managing unit, the rule-based engine unit, and the learning managing unit.

17 Claims, 4 Drawing Sheets

ONTOLOGY SYSTEM FOR CONTEXT-AWARE, METHOD THEREOF, AND RECORDING MEDIUM STORING THE SAME

BACKGROUND OF THE INVENTION

1. Field of the Invention

The present invention relates to an ontology system for context-aware, a method for managing the ontology system, and a recording medium storing the same; and, more particularly, to an ontology system for context-aware, which can be applied to various domains and express diverse context information, a method for managing the ontology system, and a recording medium storing the same.

2. Description of Related Art

In order to provide a user centric service in ubiquitous environment, a context-aware system is required to detect what a user wants based on the current context of a user and the context of surrounding environment thereof. The content-aware system receives information from sensors that collect diverse information, processes the received information, and provides a related service that a user wants. The context-aware system can intelligently process context information using ontology. The widely known study fields of the ontology are an extensible markup language (XML) based resource description framework (RDF), an ontology web language (OWL), a rule-markup language (Rule-ML), and a semantic web rule language (SWRL). There have been many studies in progress for providing various languages as an inference service through various rule-based inference engines. The context-aware system has following advantages through utilizing ontology. That is, context information can be shared and reused. Also, the context information can be inferred, extended, and interoperated in the context-aware system.

A context-aware technology using ontology according to the related art was introduced in Korean Patent Publication No. 2006-0066587, entitled "METHOD FOR MODELING CONTEXT INFORMATION USING RULES AND ONTOLOGY AND CONTEXT-AWARE SYSTEM" and published on Jun. 16, 2006.

The technology of the Korean Patent Publication No. 2006-0066587 relates to a method of expressing context information using a rule and ontology for preparing a base to provide context information that is required in a system for recognizing context information of surrounding environment in ubiquitous environment. The method includes steps of a) classifying real world to predetermined categories each having a common property and extracting context information notion words from the classified result; b) classifying information represented as the context information notion words into first information proper to model using ontology and second information proper to mode using a rule; c) modeling the first information classified in the step b); d) modeling the second information classified in the step b); and e) composing a rule base for managing the rule. According to the method of expressing context information using a rule and ontology and the context aware system in the Korean Patent Publication No. 2006-0066587, ontology is used to express information which is difficult to be expressed using rules, the ontology information is referred if it is required in rules. Therefore, context information can be effectively expressed while sustaining the advantages of each information expression method.

Another context-aware technology using ontology was introduced in Korean Patent Publication No. 2007-0009134, entitled "SYSTEM AND METHOD FOR MANAGEMENT OF CONTEXT DATA IN UBIQUITOUS COMPUTING ENVIRONMENT" and published on Jan. 18, 2007.

The technology of the Korean Patent Publication No. 2007-0009134 relates to a system and method for effectively storing and managing diverse context information to provide a context-aware service. The system includes a context information input unit for receiving context information inputted through various paths, a context information analyzing/storing unit for transforming the context information to OWL data with reference to predetermined context ontology and storing the OWL data in a relational database system, and a context information searching unit for determining the optimal service by analyzing diverse context information and searching necessary context information from the relational database system. That is, the context information management method and the system thereof for easily and effectively embodying a context-aware service by effectively managing the large amount of context information was introduced in the Korean Patent Publication No. 2007-0009134.

Furthermore, still another context-aware technology using ontology according to the related art was introduced in an article by T. Gu et. al., entitled "An Ontology Based Context Model in Intelligent Environment", in Proc. of Communication Networks and Distributed Systems Modeling and Simulations Conference, 2004. This context-aware technology according to the related art relates to a technology for defining context-aware ontologies of various domains by forming a domain independent ontology through upper level ontology for a context-aware system.

However, the context-aware ontology technologies according to the related art including the context-aware ontology technologies in the Korean Patent Publications and the article have problems as follows. The context-aware ontology technologies according to the related art fail to describe diverse context supplementary information such as a method for generating context information. Also, it is impossible to express numerical formulas using the context-aware ontology technologies according to the related art because ontology is defined only using OWL and RDF.

Since the context-aware ontology technologies according to the related art is not independent from a domain, it is insufficient to apply the context-aware ontology technologies according to the related art to various domains such as home, a school, and a hospital. Also, it is not consider to detect a user' intention or inclination for providing a related service to a user in the context-aware ontology technologies according to the related art.

Although upper level ontology is defined to apply it to various domains in the context-aware ontology technologies introduced in the Korean Patent Publications and the article, it is insufficient to express diverse context information. Similar to the context-aware ontology technologies, it is impossible to express numerical formula and Horn-Logic. Also, it is impossible to detect the user's intention and inclination.

Furthermore, it is required to newly define a classification system according to a corresponding domain whenever a context-aware system is embodied, and the context-aware system is embodied according to the classification system in the context-aware ontology technologies according to the related art.

SUMMARY OF THE INVENTION

An embodiment of the present invention is directed to providing an ontology system for expressing diverse context information such as supplementary information of context by defining context information in a form of a class, a method for managing the ontology system, and a recording medium storing the method.

Another embodiment of the present invention is directed to providing an ontology system for expressing numerical formulas and Horn-Logics using a semantic web rule language (SWRL), which could not be expressed using an ontology web language (OWL) only, a method for managing the ontology system, and a recording medium storing the method.

Another embodiment of the present invention is directed to providing an ontology system for supporting context information to be automatically processed by classifying context information by a type according to context generation principle, a method for managing the ontology system, and a recording medium storing the method.

Another embodiment of the present invention is directed to providing an ontology system for forming independent ontology from a domain by defining upper-level ontology and for providing an intelligent service by comprehending a user's intention and inclination using a learning algorithm, a method thereof, and a recording medium storing the same In accordance with an aspect of the present invention, there is provided an ontology system including: a context broker unit for receiving context information from a sensing device and verifying a validity of the received context information; a context managing unit for controlling to generate an ontology structure by transforming the verified context information from the context broker unit to ontology web language (OWL) data and processing the OWL data; a rule-based inference engine unit for transforming the processed context information from the context managing unit to semantic web rule language (SWRL) data and processing the SWRL data through an inference process; a learning managing unit for processing the processed context information from the context managing unit through learning; and a database for storing the context information processed at the context managing unit, the rule-based engine unit, and the learning managing unit.

The database may include: a history database (DB) for accumulating and storing history information determined as necessary data for learning or prediction through learning by the context managing unit among the processed context information; and an ontology database (DB) for storing the processed context information at the context managing unit, the rule-based inference engine unit, and the learning manager unit in an ontology structure after defined in a form of a class.

The context information stored in the ontology DB may be formed in an upper-level ontology structure that includes a compound upper class having classes defining a domain of context information as a lower class, an elementary upper class having classes classifying and defining processed context information to be property of the compound class into context types as a lower class, and a learning upper class having classes defining a learning method to be performed by the learning managing unit, a prediction method through learning, or a property as a lower class.

The context type may include: a sensed type generated by the context managing unit; a combined type generated by the rule-based inference engine through processing the sensed type context information using a predetermined equation; an inferred type generated by the rule-based inference engine unit through processing the sensed type context information by inference; and a learned type generated by the learning managing unit through performing a learning process or a prediction process on the sensed type history information.

The learning managing unit may use a decision tree method or a neural network method as the learning method or the prediction method through learning.

The context managing unit may control the ontology structure to be expanded through using the upper-level ontology structure as a basic structure and adding lower classes, and may control a lower class defined for a first domain to be usable as a lower class for a second domain In accordance with another aspect of the present invention, there is provided a method for managing ontology in an ontology system having a context broker unit, a context managing unit, a rule-based inference engine unit, a learning managing unit, a history database (DB), and an ontology DB, including the steps of: at the context broker unit, receiving context information from an sensing device and verifying validity of the received context information; at the context managing unit, receiving the verified context information from the context broker unit, transforming the received context information to ontology web language (OWL) data, processing the OWL data, and storing the processed OWL data in the ontology DB; at the context managing unit, determining whether a learning process or a prediction process through learning is necessary or not for the context information; at the rule-based engine unit, transforming the context information stored in the ontology DB to semantic web rule language (SWRL) data, processing the SWRL data through an inference process, and storing the processed SWRL data in the ontology DB; at the context managing unit, determining whether a request of learning or a request of prediction through learning is received or not; storing the processed context information in the history DB as history information if the learning process or the prediction process is necessary; at the learning managing unit, processing the history information through the learning process or the prediction process through learning and storing the processed history information in the ontology DB.

The processed context information may be decided in a form or a class and stored in the ontology DB in an ontology structure.

The context information stored in the ontology DB is formed in an upper-level ontology structure that includes a compound upper class having classes defining a domain of context information as a lower class, an elementary upper class having classes classifying and defining processed context information to be property of the compound class into context types as a lower class, and a learning upper class having classes defining a learning method to be performed by the learning managing unit, a prediction method through learning, or a property as a lower class.

The context type may include: a sensed type generated by the context managing unit; a combined type generated by the rule-based inference engine through processing the sensed type context information using a predetermined equation; an inferred type generated by the rule-based inference engine unit through processing the sensed type context information by inference; and a learned type generated by the learning managing unit through performing a learning process or a prediction process on the sensed type history information The learning managing unit may use a decision tree method or a neural network method as the learning method or the prediction method through learning.

The ontology structure may include the upper-level ontology structure as a basic structure, expands through adding lower classes, and uses a lower class defined for a first domain as a lower class for a second domain.

In accordance with still another aspect of the present invention, there is provided a computer readable recording medium for storing a data structure of context information received from a sensing device for context aware, including: first context information generated by transforming the context information from the sensing device to ontology web language (OWL) data and processing the OWL data; and second context information generated by transforming the context information from the sensing device to semantic web rule language (SWRL) data and processing the SWRL data through an inference process or a learning process, wherein the first and second context information are defined in a form of a class and stored in an ontology structure, and wherein necessary context information for learning or for prediction through learning is selected from the first and second context information, and the selected context information is accumulated as history information.

The processed context information may be formed in the upper-level ontology including a compound upper class having classes defining a domain of context information as a lower class, an elementary upper class having classes classifying and defining processed context information to be property of the compound class into context types as a lower class, and a learning upper class having classes defining a learning method to be performed by the learning managing unit, a prediction method through learning, or a property as a lower class.

The context type may include: a sensed type generated by the context managing unit; a combined type generated by the rule-based inference engine through processing the sensed type context information using a predetermined equation; an inferred type generated by the rule-based inference engine unit through processing the sensed type context information by inference; and a learned type generated by the learning managing unit through performing a learning process or a prediction process on the sensed type history information.

A decision tree method or a neural network method may be used as the learning method or the prediction method through learning.

The ontology structure may have the upper-level ontology structure as a basic structure, expands through adding lower classes, and uses a lower class defined for a first domain as a lower class for a second domain.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

DESCRIPTION OF SPECIFIC EMBODIMENTS

Figure 1:
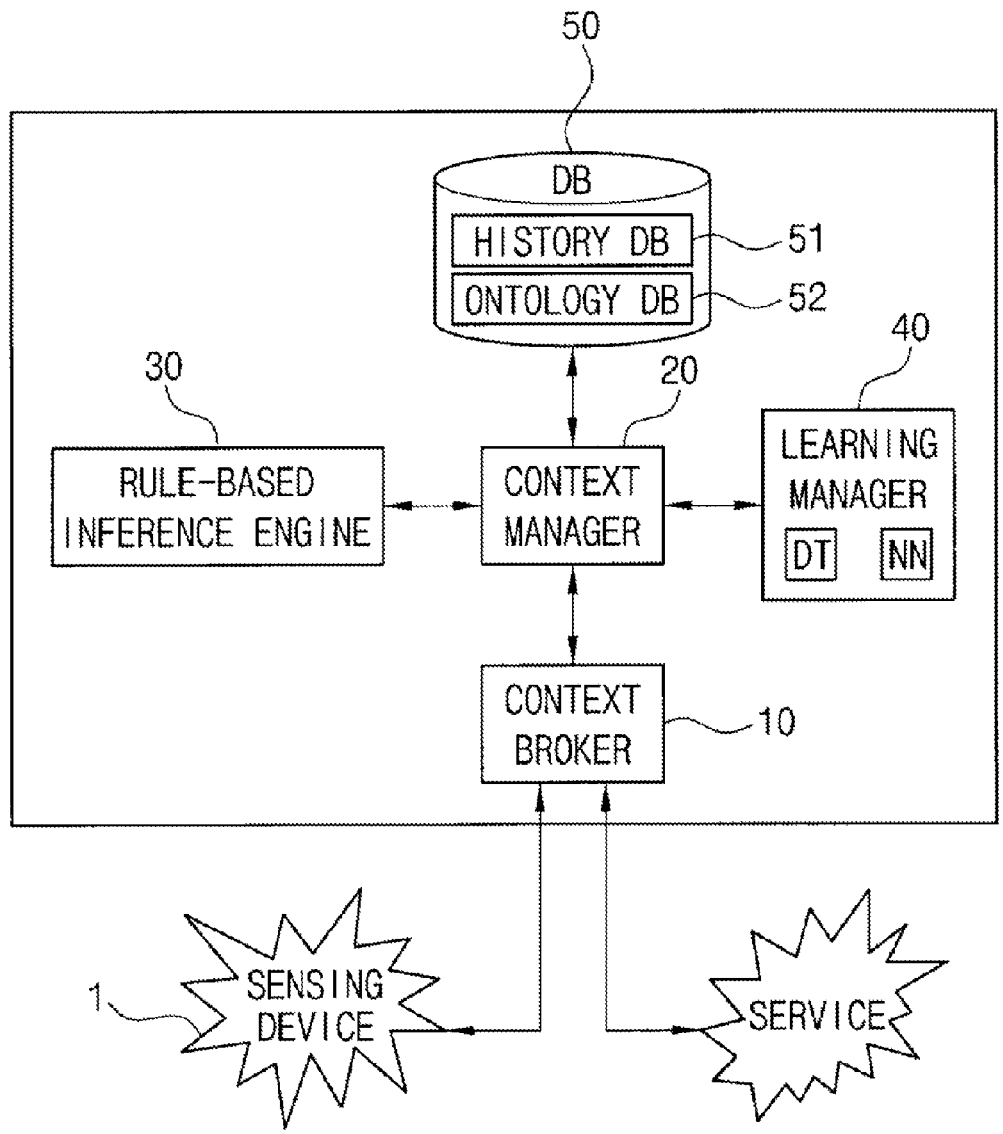
FIG. 1 is a block diagram illustrating an otology system for context-aware in accordance with an embodiment of the present invention.

The advantages, features and aspects of the invention will become apparent from the following description of the embodiments with reference to the accompanying drawings, which is set forth hereinafter. Throughout the accompanying drawings, like reference numerals denotes like elements. Repeated descriptions of the same elements are omitted.

An ontology system for context-aware in accordance with an embodiment of the present invention will be described with reference to FIGS. 1 through 3.

FIG. 1 is a block diagram illustrating an ontology system for context-aware in accordance with an embodiment of the present invention.

As shown in FIG. 1, the ontology system according to the present embodiment includes a context broker 10, a context manager 20, a rule-based inference engine 30, a leaning manager 40, and a database DB 50. The context broker 10 receives context information from a sensing device 1 and verifies the validity of the received context information. The context manager 20 transforms the verified context information to ontology web language (OWL) data and processes the transformed context information through an inference process. The rule-base inference engine 30 transforms the processed context information from the context to semantic web rule language (SWRL) and processes the transformed context information through an inference process. The learning manager 40 performs a learning process on the processed context information from the context manager 20. The database DB 50 stores the processed context information from the context manager 20, the rule-based inference engine 30, or the learning manager 40.

The database 50 includes a history DB 51 and an ontology DB 52. The history DB 51 stores history information for a learning process or for a prediction process through learning. The ontology DB 52 stores processed context information, which is defined in a form of a class, in an ontology structure. The history information is accumulated by the determination of the context manager 20. The accumulated history information is used by the learning manager 40 for performing a learning process or a prediction process through learning.

The ontology system according to the present embodiment uses an OWL and a SWRL. The OWL can express a description-logic (DL) language in an ontology format and can provide an inference service through the rule-based inference engine 30. Also, the SWRL is an ontology language introduced to express a Horn-Logic language due to the limitation of an expression range of a typical OWL. The ontology system according to the present embodiment can express a numerical formulas type Horn-Logic in an ontology format using the SWRL, which was impossible to express in the ontology format using a DL based OWL.

The relation among the context broker 10, the context manager 20, and the learning manager 40 will be described as follows. At first, the context broker 10 verifies validity of the context information received from the external sensing device 1 and transfers the valid context information to the context manager 20. The context manager 20 controls the rule-based inference engine 30, the learning manager 40, the history DB 51, and the ontology DB 52 based on the verified context information. The learning manager 40 performs various functions to provide intelligent services to a user and uses diverse learning algorithms. Herein, the intelligent service is provided to a user basically using a decision-tree (DT) method that is a machine learning algorithm and a neural-network (NN) algorithm. Also, the ontology structure is systemized to easily apply a learning algorithm. Other learning algorithms can be used as well as DT or NN. The learning manager 40 accumulates learning data in the history DB as history information using context information inputted from the external sensing device 1. The learning manager 40 performs a learning process using the accumulated history information and provides the inferred result to a user as a service.

The ontology system according to the present embodiment uses the rule-based inference engine 30. The ontology may be simple knowledge expression. In other words, it is possible to express information such that 'if A equals B and B equals C than A equals C' using ontology. In order to perform a real inference service using such information, an inference engine is required. In the present embodiment, the inference engine 30 performs a function for inferring ontology expressed in an OWL and a SWRL.

The ontology DB 52 stores the processed context information defined in a form of a class. That is, a context is defined as a class in the present embodiment. Therefore, it is possible to express diverse supplementary information in the property of the class as well as the value of the context. Since the 'class' is a term widely used in those skilled in the art, the detailed description thereof is omitted.

Figure 2:
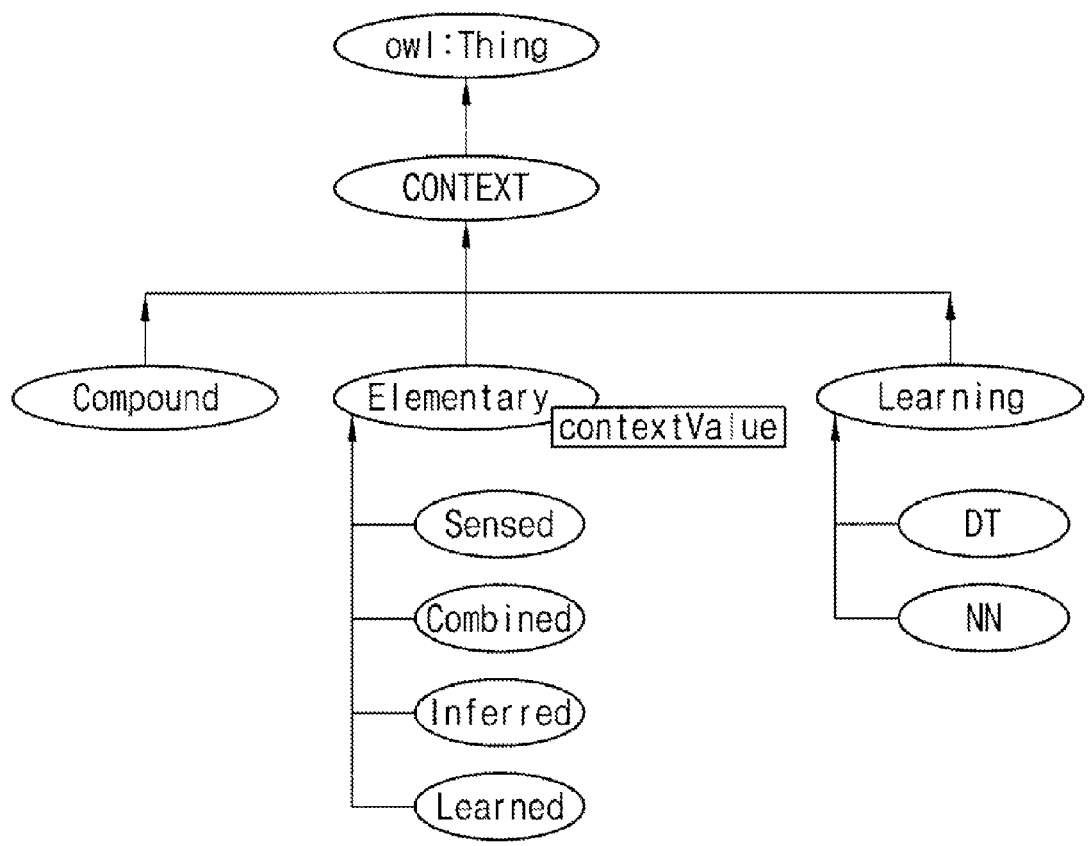
FIG. 2 is a diagram illustrating an upper-level ontology structure in accordance with an embodiment of the present invention.
Figure 3:
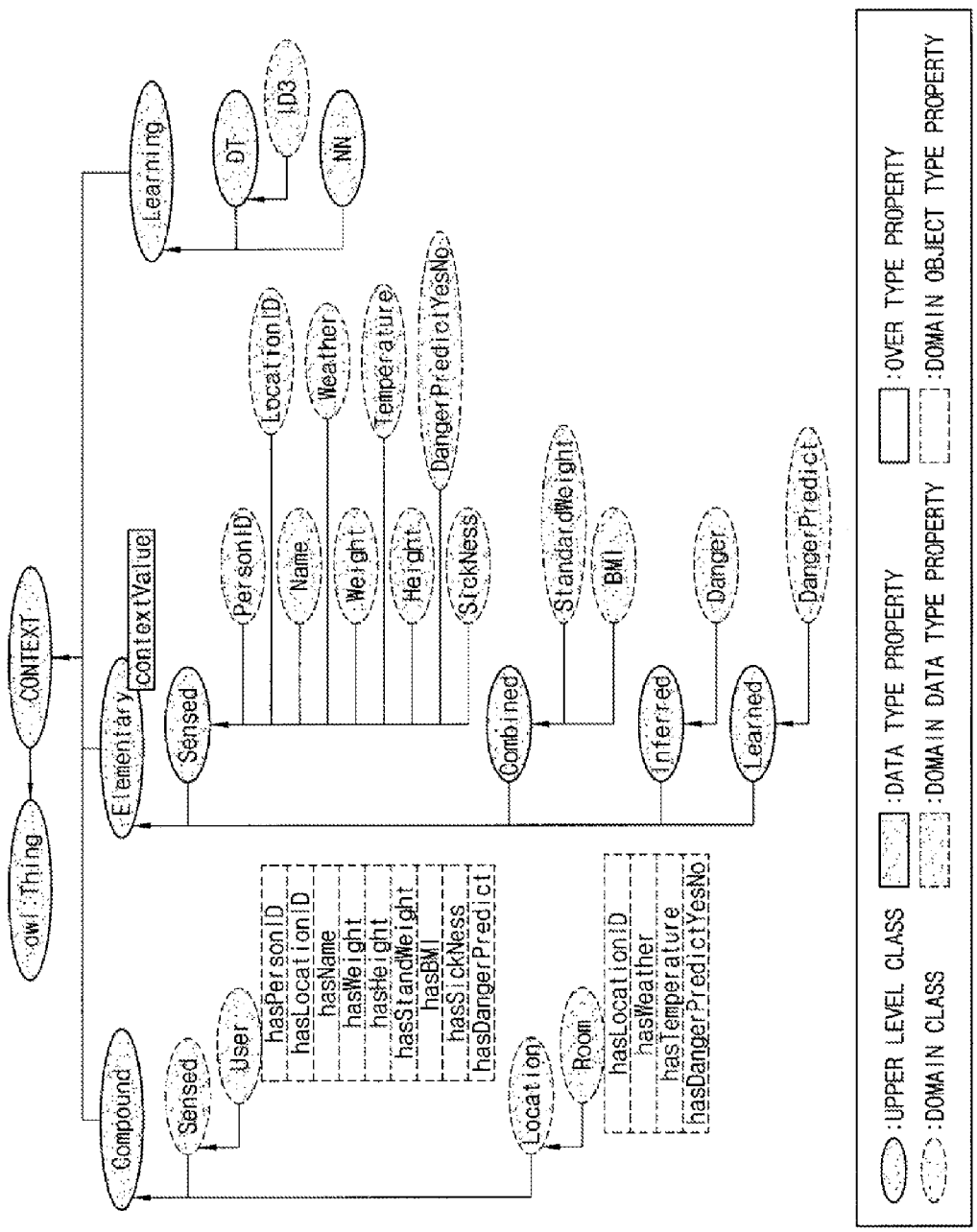
FIG. 3 is a diagram illustrating a domain-level otology structure in accordance with an embodiment of the present invention.

FIG. 2 is a diagram illustrating an upper-level ontology structure in accordance with an embodiment of the present invention, and FIG. 3 is a diagram illustrating a domain-level otology structure in accordance with an embodiment of the present invention.

As shown in FIG. 2, the context information stored in the ontology DB 52 basically has an upper-level ontology structure. The upper-level ontology structure enables one to easily define ontology used in context-aware systems for various domains. Also, a general formation of ontologies that are applied to various domains can be sustained using the upper-level ontology structure. Therefore, the upper-level ontology structure has higher expendability compared to ontology dependable to typical domain. Also, the upper-level ontology structure enables one to build context-aware systems for various domains with high stability at a comparatively short time using the upper level ontology structure in a framework. As shown in FIG. 3, an ontology structure has the upper-level ontology structure as a basic structure and may expand to a domain-level ontology structure by adding a lower class. Although the added lower class is a lower class expressing the supplementary information of a domain, a lower class defined for the other domain may be added.

The upper-level ontology includes a compound upper class, an elementary upper class, and a learning upper class. The compound upper class includes classes that define the domain of context information as lower classes. The elementary upper class also includes classes classifying and defining processed context information, which is the property of the compound class, by context types as lower classes. The learning upper class includes a class defining a learning method to be performed in the learning manager 40, a class defining a prediction method through learning, and classes defining the properties of learning and prediction as lower classes. Each of the upper classes will be described in detail, hereinafter.

The compound upper class may define domain classes such as domain classes 'User' and 'Room' through lower classes 'Person' and 'Location'. The domain classes 'User' and 'Room' may have properties 'hasWeight' and 'hasHeight', which are defined as object type properties of diverse contexts that are defined as the lower class of the basic upper class. For the reference, the class property of the ontology is divided into a data type property and an object type property.

The elementary upper class is classified by a context type that is divided according to the generation type of context. Through such classification, the elementary upper class expresses diverse context information. The basic upper class uses context types classified for smoothly processing and expressing context information. The context of the ontology, which is expressed through such classification, can handle a process according to a context type in a framework. The context type is defined in four types, a sensed type, a combined type, an inferred type, and a learned type.

The sensed type is a type of context information processed and generated by the context manager 20, which received from various sensing devices 1. The sensed type is a basic context type for all other context types.

The combined type is a type of context information generated by processing the sensed type context information through predetermined calculation at the rule-based inference engine 30. That is, the combined type is context information generated through calculating a predetermined equation of the rule-based inference engine 30, not context information received from the external sensing devices. The combined type context information is expressed in a SWRL for a predetermined equation for context information. Hereinafter, the combined type context information expressed in the SWRL will be described through a procedure of processing the combined type context information.

A SWRL rule is defined first. For example, a SWRL rule for a class 'StandWeight' which is the combined type context information is defined as follows. The equation and the SWRL rule of the class 'StandWeight' are shown below.

$$SW = (Height - 100.0) \times 0.8 \qquad \text{Eq. 1}$$

SW Rule
upper: PersonID(?x)^Height(?y)^upper:hasPersonID(?y,?x)
 ^upper:contextValue(?y,?z)^swrlb:subtract(?a,?z,100.0)
 ^swrlb:multiply(?b,?a,0.8)^StandWeight(?c)
 ^upper:hasPersonID(?c,?x)
 ->upper:contextValue(?c,?b)

In Eq. 1, a stand weight SW is calculated by subtracting 100 from the height of a user and multiplying 0,8 to the subtracting result. Eq. 1 is defined as the SWRL rule as follows. 'upper:PersonID(?x)^Height(?y)^upper:hasPersonID (?y,?x)' means that a variable '?x' is an ID object of a user, a variable '?y' is an object 'Height', and a variable '?y' denotes the relation 'hasPersonID' of the variable '?x'. That is, the variable '?y' means that a key(?y) has a user ID (?x) as a property 'hasPersonID'. 'upper:hasContextValue(?y,?z)' means that a variable '?y', an object 'Height', has a variable '?z' as 'hasContextValue'. 'swrlb:subtract(?a,?z,100.0)' means that a value calculated by subtracting 100 from a variable '?z' that is a 'Height' value is a variable '?a'. 'swrlb: multiply(?b,?a,0.8)' means that a variable '?b' is allocated with a value calculated by multiplying 0.8 to the previously calculated value '?a'. 'StandWeight(?c)' denotes that a variable '?c' is an object of a class 'StandWeight', and 'upper: hasPersonID(?c,?x)' means that the object of a class 'StandWeight' also has the same 'PersonID' of the class Height. 'upper:contextValue(?c,?b)' means that an object 'StandWdith' which is a variable '?c' has the value of a variable '?b' if given conditions are all satisfied. Therefore, a variable '?b' becomes a variable generated by the calculation conditions of 'swrlb'.

By defining SWRL as described above, rules can be defined independently from an rule-based inference engine, which was defined dependent to a typical rule-based inference engine. Therefore, a rule-based inference service can be provided to a user using various rule-based inference engines.

The inferred type is a type of context information generated by the rule-based inference engine 30. That is, the rule-based inference engine 30 generates the inferred type context information by processing the sensed type context information through inference. The inferred type context information is not context information received from the outside. The inferred type context information is generated through interference. Although the inferred type context information is similar to the combined type context information, the inferred type context information is generated by a rule. The inferred type context information can be expressed in a SWRL form.

The learned type context information is generated by the learning manager 40. That is, the learning manager 40 generates the learned type context information by processing sense type history information using a learning method or a prediction method using learning. The learned type context information is generated by a learning algorithm DT or NN. The learned type context information is context information generated by processing the other types of context information to history information and performing the learning process on the history information. The learning process is performed after data has been accumulated for a predetermined time or period. Therefore, the learning process can give an answer to a question like 'if a predetermined event occurred or if a predetermined event is currently occurring, what happens?'. That is, if context information such as 'a user A played tennis on cloudy and windy Monday', 'a user A did not play tennis on raining and storming Tuesday', and 'a user A played tennis on bright and windy Wednesday' is regularly received, context information necessary for a learning algorithm defined in ontology is searched from the received context information. Then, the searched context information is accumulated in the learning history DB 51, and the learning manager 40 performs a learning process through the accumulated history information.

After performing the learning process using the learning algorithm such as DT, learning result files such as a rule table and a class are generated. Through the learning result files, it is possible to obtain an answer for the question 'will a user A play tennis if a weather is ~~ and a wind is ~~~'. The answer is stored in the ontology DB 52 as the learned type context information and will be used in later.

The learning upper class is for providing an intelligent service to a user by detecting the user's intention and inclination. The reason of defining the learning upper class as an ontology upper class is to define a learning method and the property of the learning method to be used in the context-aware system.

As described above, the upper-level ontology according to the present embodiment can be used as the standard formation of ontology for various domains such as school, company, and hospital. Using the upper-level ontology as the standard formation, ontology for a new domain can be easily and quickly defined. Also, a basic formation of ontology for various domains can be stably and constantly sustained by defining the upper-level ontology according to the present embodiment. Therefore, context information can be easily shared and expands through the upper-level ontology. In other words, ontology is defined to define the supplementary information of context such as sensor information and location information by defining a context as a class and to apply a learning process in order to express context information in various ways in the present embodiment.

Hereinafter, a method for managing an ontology system for context-aware in accordance with an embodiment of the present invention will be described.

Figure 4:
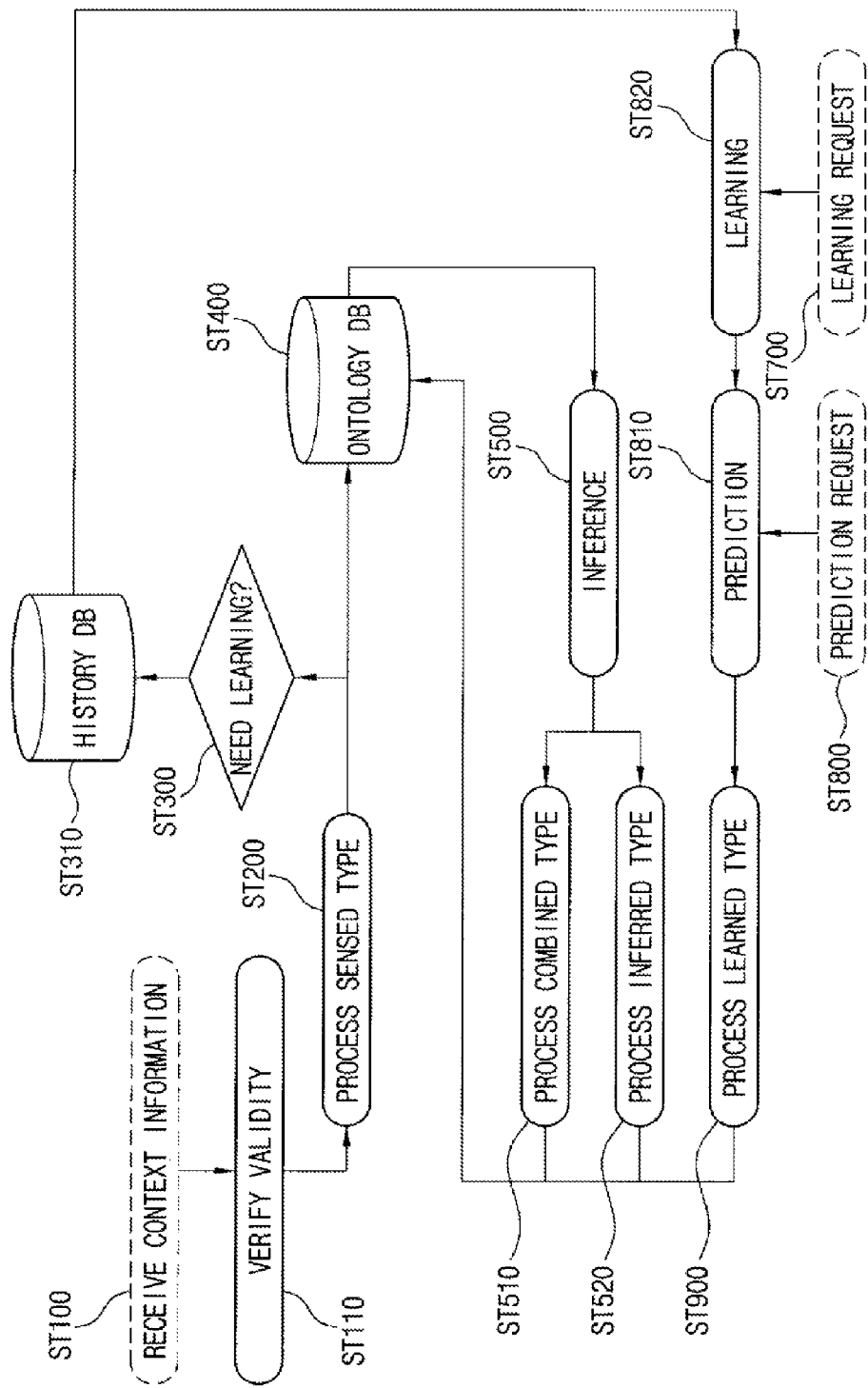
FIG. 4 is a flowchart illustrating a method for managing ontology for context-aware in accordance with an embodiment of the present invention.

FIG. 4 is a flowchart illustrating a method for managing an ontology system for context-aware in accordance with an embodiment of the present invention.

As shown in FIG. 4, the context broker receives context information from the sensing device 1 at step ST100 and verifies the validity of the received context information at step ST110. After verifying, the context broker 10 transmits context information to the context manager 20. The context manager 20 receives the context information from the context broker 10, processes the received context information to sensed type context information by transforming the verified context information to OWL data at step ST200 and stores the sensed type context information in the ontology DB 52 at step ST400. Simultaneously, the context manager 20 determines whether a learning process or a prediction process through learning is required for the sensed type context information or not at step ST300. If it is necessary, the sensed type context information is accumulated and stored in the history DB 51 as history information at step ST310.

Then, combined type context information and inferred type context information are generated using the processed sensed type context information. That is, the rule-based inference engine 30 processes the sensed type context information stored in the ontology DB 52 to inferred context information by transforming the sensed type context information to SWRL data and performing an inference process on the SWRL data at step ST500. Then, the rule-based inference engine 30 stores the inferred context information in the ontology DB 52 at step ST400. Herein, combined type context information is processed through calculation at step ST510 and the inferred type context information is processed through rule inference at step ST520.

The learned type context information is processed according to a request of learning or a request of prediction through learning. That is, if the learning request is received at step ST700 or if the prediction request is received at step ST800, the learning manager 40 processes history information stored in the history DB 51 to the learned type context information at step ST900 through a learning process at step ST820 or a prediction process at step ST810. Then, the learning manager 40 stores the learned type context information in the ontology DB 52 at step ST400.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

While the present invention has been described with respect to certain preferred embodiments, it will be apparent to those skilled in the art that various changes and modifications may be made without departing from the spirits and scope of the invention as defined in the following claims.

According to the ontology system, the method for managing the ontology system, and the recording medium storing the method of the present invention, various context information can be expressed through ontology.

According to the ontology system, the method for managing the ontology system, and the recording medium storing the method of the present invention, ontology can be easily defined by defining classification types of context, which are independent from a domain, and a context-aware system can be embodied conveniently.

According to the ontology system, the method for managing the ontology system, and the recording medium storing the method of the present invention, an intelligent service can be provided by comprehending a user's intention and inclination through learning.

What is claimed is:

1. An ontology system comprising:
a processor;
a context broker means for receiving context information from a sensing device and verifying a validity of the received context information;
a context managing means for controlling to generate an ontology structure by transforming the verified context information from the context broker means to ontology web language (OWL) data and processing the OWL data;
a rule-based inference engine means for transforming the processed context information from the context managing means to semantic web rule language (SWRL) data and generating combined type information and inferred type information, wherein the combined type information is generated through processing the SWRL data using a predetermined equation, and the inferred type information is generated through processing the SWRL data by an inference process;
a learning managing means for processing the processed context information from the context managing means through learning; and
a database for storing the context information processed at the context managing means, the rule-based inference engine means, and the learning managing means.

2. The ontology system of claim 1, wherein the database includes:
a history database (DB) for accumulating and storing history information determined as necessary data for learning or prediction through learning by the context managing means among the processed context information; and
an ontology database (DB) for storing the processed context information at the context managing means, the rule-based inference engine means, and the learning manager means in an ontology structure after defined in a form of a class.

3. The ontology system of claim 2, wherein the context information stored in the ontology DB is formed in an upper-level ontology structure that includes a compound upper class having classes defining a domain of context information as a lower class, an elementary upper class having classes classifying and defining processed context information to be property of the compound class into context types as a lower class, and a learning upper class having classes defining a learning method to be performed by the learning managing means, a prediction method through learning, or a property as a lower class.

4. The ontology system of claim 3, wherein the context types include:
a sensed type generated by the context managing means;
the combined type generated by the rule-based inference engine means;
the inferred type generated by the rule-based inference engine means; and
a learned type generated by the learning managing means through performing a learning process or a prediction process on the sensed type history information.

5. The ontology system of claim 4, wherein the learning managing means uses a decision tree method or a neural network method as the learning method or the prediction method through learning.

6. The ontology system of claim 5, wherein the context managing means controls the ontology structure to be expanded through using the upper-level ontology structure as a basic structure and adding lower classes, and controls a lower class defined for a first domain to be usable as a lower class for a second domain.

7. A processor-based method for managing ontology in an ontology system having a context broker means, a context managing means, a rule-based inference engine means, a learning managing means, a history database (DB), and an ontology DB, comprising the steps of:
at the context broker means, receiving context information from a sensing device and verifying validity of the received context information;
at the context managing means, receiving the verified context information from the context broker means, transforming the received context information to ontology web language (OWL) data, processing the OWL data, and storing the processed OWL data in the ontology DB;
at the context managing means, determining whether a learning process or a prediction process through learning is necessary or not for the context information;
at the rule-based inference engine means, transforming the context information stored in the ontology DB to semantic web rule language (SWRL) data, generating combined type information and inferred type information by processing the SWRL data, and storing the processed SWRL data including the combined m e information and the inferred type information in the ontology DB, wherein the combined type information is generated through processing the SWRL data using a predetermined equation, and the inferred type information is generated through processing, the SWRL data by an inference process;
at the context managing means, determining whether a request of learning or a request of prediction through learning is received or not;
storing the processed context information in the history DB as history information if the learning process or the prediction process is necessary;
at the learning managing means, processing the history information through the learning process or the prediction process through learning and storing the processed history information in the ontology DB.

8. The method of claim 7, wherein the processed context information is decided in a form or a class and stored in the ontology DB in an ontology structure.

9. The method of claim 8, wherein the context information stored in the ontology DB is formed in an upper-level ontology structure that includes a compound upper class having classes defining a domain of context information as a lower class, an elementary upper class having classes classifying and defining processed context information to be property of the compound class into context types as a lower class, and a learning upper class having classes defining a learning method to be performed by the learning managing means, a prediction method through learning, or a property as a lower class.

10. The method of claim 9, wherein the context types include:
a sensed type generated by the context managing means;
the combined type generated by the rule-based inference engine means;
the inferred type generated by the rule-based inference engine means; and a learned type generated by the learning managing means through performing a learning process or a prediction process on the sensed type history information.

11. The method of claim 10, wherein the learning managing means uses a decision tree method or a neural network method as the learning method or the prediction method through learning.

12. The method of claim 11, wherein the ontology structure has the upper-level ontology structure as a basic structure, expands through adding lower classes, and uses a lower class defined for a first domain as a lower class for a second domain.

13. A non-transitory computer readable recording medium for storing a data structure of context information received from a sensing device for context aware, comprising:
   first context information generated by transforming the context information from the sensing device to ontology web language (OWL) data and processing the OWL data; and
   second context information generated by transforming the context information from the sensing device to semantic web rule language (SWRL) data,
   wherein the second context information includes combined type information generated through processing the SWRL data using a predetermined equation, inferred type information generated through processing the SWRL data by an inference process, and learned the information generated through process in ˆ the SWRL data by a learning process,
   wherein the first and second context information are defined in a form of a class and stored in an ontology structure, and
   wherein necessary context information for learning or for prediction through learning is selected from the first and second context information, and the selected context information is accumulated as history information.

14. The computer readable recording medium of claim 13, wherein the processed context information is formed in the upper-level ontology including a compound upper class having classes defining a domain of context information as a lower class, an elementary upper class having classes classifying and defining processed context information to be property of the compound class into context types as a lower class, and a learning upper class having classes defining a learning method to be performed by the learning managing means, a prediction method through learning, or a property as a lower class.

15. The computer readable recording of claim 14, wherein the context types include:
   a sensed type generated by transforming verified context information to ontology web language (OWL) data and processing the OWL data;
   the combined type generated by using the predetermined equation;
   the inferred type generated by the inference process; and
   a learned type generated by the learning process or a prediction process on sensed type history information.

16. The computer readable recording of claim 15, wherein a decision tree method or a neural network method is used as the learning method or the prediction method through learning.

17. The computer readable recording medium of claim 16, wherein the ontology structure has the upper-level ontology structure as a basic structure, expands through adding lower classes, and uses a lower class defined for a first domain as a lower class for a second domain.

* * * * *